United States Patent
Overmyer

(10) Patent No.: US 10,843,101 B2
(45) Date of Patent: *Nov. 24, 2020

(54) DISTILLATION COLUMN HAVING REMOVABLE TRAY ASSEMBLY

(71) Applicants: Still Technologies, LLC, Frisco, TX (US); Insight Technologies, LLC, Kenosha, WI (US)

(72) Inventor: Jonathan P. Overmyer, McHenry, IL (US)

(73) Assignees: Still Technologies, LLC, Frisco, TX (US); Insight Technologies, LLC, Kenosha, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/396,688

(22) Filed: Apr. 28, 2019

(65) Prior Publication Data

US 2019/0247767 A1    Aug. 15, 2019

Related U.S. Application Data

(63) Continuation of application No. 14/590,989, filed on Jan. 6, 2015, now Pat. No. 10,272,355.

(Continued)

(51) Int. Cl.
| | |
|---|---|
| *B01D 3/32* | (2006.01) |
| *B01D 3/16* | (2006.01) |
| *B01D 3/20* | (2006.01) |
| *B01D 3/22* | (2006.01) |
| *B01D 3/00* | (2006.01) |

(52) U.S. Cl.
CPC ............ *B01D 3/324* (2013.01); *B01D 3/002* (2013.01); *B01D 3/163* (2013.01); *B01D 3/205* (2013.01); *B01D 3/22* (2013.01)

(58) Field of Classification Search
CPC .......... B01D 3/324; B01D 3/002; B01D 3/22; B01D 3/163; B01D 3/205
See application file for complete search history.

(56) References Cited

U.S. PATENT DOCUMENTS

| | | | | | |
|---|---|---|---|---|---|
| 1,738,036 | A | * | 12/1929 | Chillas, Jr. ............... | B01D 3/18 261/114.1 |
| 1,782,735 | A | * | 11/1930 | MacKenzie .............. | B01D 3/22 261/113 |

(Continued)

OTHER PUBLICATIONS

Hillbilly Flute, Hillbilly Stills, published May 28, 2011, available at http://web.archive.org/web/20110528182102/http://www.hillbillystills.com:80/category_s/44.htm.

(Continued)

*Primary Examiner* — Stephen Hobson
(74) *Attorney, Agent, or Firm* — Katarzyna Brozynski

(57) ABSTRACT

A distillation column and tray assembly is disclosed herein. The distillation column includes a removable inner tray assembly with adjustable downcomer tubes. The removable tray assembly enables the user to selectively change distillation plates when so removed. When removed, a distiller or brewer may adjust the downcomer tubes to change the fluid level on the distillation plates, or bypass certain distillation plates completely. Certain embodiments of the invention include a feature of an O-ring recessed around a perimeter of the plates permitting a tight seal and reducing manufacturing costs.

7 Claims, 14 Drawing Sheets

Related U.S. Application Data

(60) Provisional application No. 61/923,983, filed on Jan. 6, 2014.

(56) References Cited

U.S. PATENT DOCUMENTS

| | | | | |
|---|---|---|---|---|
| 2,201,949 | A * | 5/1940 | Wentworth | B01D 3/20 261/114.1 |
| 2,939,771 | A * | 6/1960 | McDonald | B01D 3/32 422/255 |
| 3,179,389 | A * | 4/1965 | Nutter | B01D 3/163 261/114.1 |
| 3,195,987 | A * | 7/1965 | Hardison | B01J 8/0492 422/605 |
| 3,464,679 | A * | 9/1969 | Becker | B01D 3/24 261/114.1 |
| 4,126,540 | A * | 11/1978 | Grosboll | B01J 8/0278 208/146 |
| 4,233,269 | A * | 11/1980 | Kaye | B01F 5/0451 261/114.1 |
| 4,308,107 | A | 12/1981 | Markfort | |
| 4,391,675 | A | 7/1983 | Lynn et al. | |
| 4,615,770 | A | 10/1986 | Govind | |
| 4,657,638 | A | 4/1987 | le Grand et al. | |
| 4,784,555 | A * | 11/1988 | Cantrell | F16B 37/14 403/372 |
| 4,995,946 | A * | 2/1991 | Auger | B01D 3/20 202/158 |
| 5,013,407 | A | 5/1991 | Nocca et al. | |
| 5,091,060 | A | 2/1992 | Walker et al. | |
| 5,118,449 | A * | 6/1992 | Wade | B01D 3/326 261/114.1 |
| 5,352,276 | A * | 10/1994 | Rentschler | B01D 19/0005 261/114.1 |
| D363,758 | S | 10/1995 | Boucher et al. | |
| 5,518,668 | A * | 5/1996 | Chresand | B01D 3/22 261/113 |
| 5,702,647 | A * | 12/1997 | Lee | B01D 3/22 261/114.5 |
| 5,709,780 | A | 1/1998 | Ognisty et al. | |
| 5,942,197 | A * | 8/1999 | Gupta | B01D 3/16 261/148 |
| 6,003,847 | A * | 12/1999 | Lee | B01D 3/20 261/114.1 |
| 6,059,934 | A * | 5/2000 | Stober | B01D 1/30 202/158 |
| 6,123,323 | A * | 9/2000 | Yoneda | B01D 3/16 261/113 |
| 6,131,891 | A * | 10/2000 | Resetarits | B01D 3/20 202/158 |
| 6,272,884 | B1 * | 8/2001 | Billingham | F25J 3/04412 356/501 |
| 6,375,921 | B1 | 4/2002 | Eickhoff et al. | |
| 7,238,773 | B2 * | 7/2007 | Huebinger | C08F 6/10 528/500 |
| 8,419,903 | B2 | 4/2013 | Bahr | |
| D718,646 | S * | 12/2014 | Overmyer | D10/81 |
| 9,186,600 | B2 * | 11/2015 | Alzner | B01D 3/22 |
| 9,533,267 | B2 * | 1/2017 | Greene | B01F 5/0413 |
| 2009/0277775 | A1 * | 11/2009 | Metsa | C02F 1/4608 204/164 |
| 2010/0032938 | A1 * | 2/2010 | Jensen | F16L 55/1705 285/15 |
| 2013/0140722 | A1 | 6/2013 | Zinobile et al. | |
| 2013/0234348 | A1 * | 9/2013 | Nieuwoudt | B01D 3/22 261/114.5 |
| 2014/0284824 | A1 * | 9/2014 | Bechtel | B01D 3/166 261/148 |
| 2015/0357059 | A1 * | 12/2015 | Lin | G21C 3/322 376/399 |
| 2016/0271516 | A1 * | 9/2016 | Blaschke | B01D 3/20 |
| 2017/0304743 | A1 * | 10/2017 | Fischer | B01D 3/346 |

OTHER PUBLICATIONS

Moonshine Stills, Moonshine still, copper moonshine still, Hillbilly Flute, Mike Haney, published Jan. 15, 2011, available at https://www.youtube.com/watch?v=8u2WEdux0Q8.

Harley03 "Flute Talk" Home Distiller published Jun. 1, 2013 accessed at https://homedistiller.org/forum/viewtopic.php?f=17&t=59216&start=1380>(Year:2013).

* cited by examiner

DISTILLATION COLUMN HAVING REMOVABLE TRAY ASSEMBLY

CROSS-REFERENCE TO RELATED APPLICATIONS

This application is a continuation of U.S. application Ser. No. 14/590,989, filed Jan. 6, 2015, which claims priority to U.S. Provisional Application No. 61/923,983 filed Jan. 6, 2014. Each of these patent applications is hereby incorporated herein by reference in its entirety to provide continuity of disclosure.

TECHNICAL FIELD

This disclosure relates to brewing equipment and more particularly to distillation columns tray assemblies.

BACKGROUND

The statements in this section merely provide background information related to the present disclosure and may not constitute prior art.

In a conventional method of distillation and dehydration of ethanol from a beer mash, which contains ethanol, water, and solids, the mash is preheated and fed into a distillation column. In the distillation column, the mash is concentrated by evaporation, and the solids are removed as a bottom product together with water. A portion of the bottom product is usually returned to the distillation column after heating.

In some systems a first distillate in the form of a vapor, which still contains water, ethanol, and fusel oils, is fed, possibly via a collecting and mixing tank, into a second distillation column, which is designed as a rectifying column. A more extensive separation is carried out in this rectifying column, and the fusel oils are removed in a sidestream. Of the water separated as bottom product in the second distillation column, a small fraction is returned to the rectifying column after heating, and the remainder is removed, so that it is eliminated from the production process. The distillate of the second distillation column, which, as before, contains water and ethanol, can be partly returned to the first and second distillation columns, possibly via the aforementioned collecting tank, to increase ethanol purity or treat the fluids in accordance with a recipe.

Known column innards including downcomer plates and tubes are welded static prohibiting plate and tube interchanges or removal. It has become evident that replacing and changing downcomer tubes and/or plates can advantageously affect run characteristics and enable a brewer or distiller flexibility when making products and designing a product line.

Further, known distillation columns often do not have a tight seal between downcomber plates and side walls of the distillation column. Known sealing methods try to weld the plate to the inner wall of the column body to create a tight seal. These welds are often porous or incomplete as the difficulty in welding in small confines often proves too challenging. Welding is further problematic as the diametric size of distillation columns is reduced. Therefore it would be advantageous to make an internal seal without the use of welding.

SUMMARY

A distillation column and tray assembly is disclosed herein.

The overall system includes a removable inner distillation tray assembly with adjustable downcomer tubes. The removable tray assembly enables the user to remove the tray assembly and selectively change plates. When removed a distiller or brewer may adjust the downcomer tubes to change the fluid level on the plates, or bypass certain plates completely.

Certain embodiments of the invention include a feature of an O-ring recessed around a perimeter of the plates permitting a seal between the plates and an interior wall of a distillation column.

This summary is provided merely to introduce certain concepts and not to identify key or essential features of the claimed subject matter.

BRIEF DESCRIPTION OF THE DRAWINGS

One or more embodiments will now be described, by way of example, with reference to the accompanying drawings, in which.

DETAILED DESCRIPTION

Figure 1:
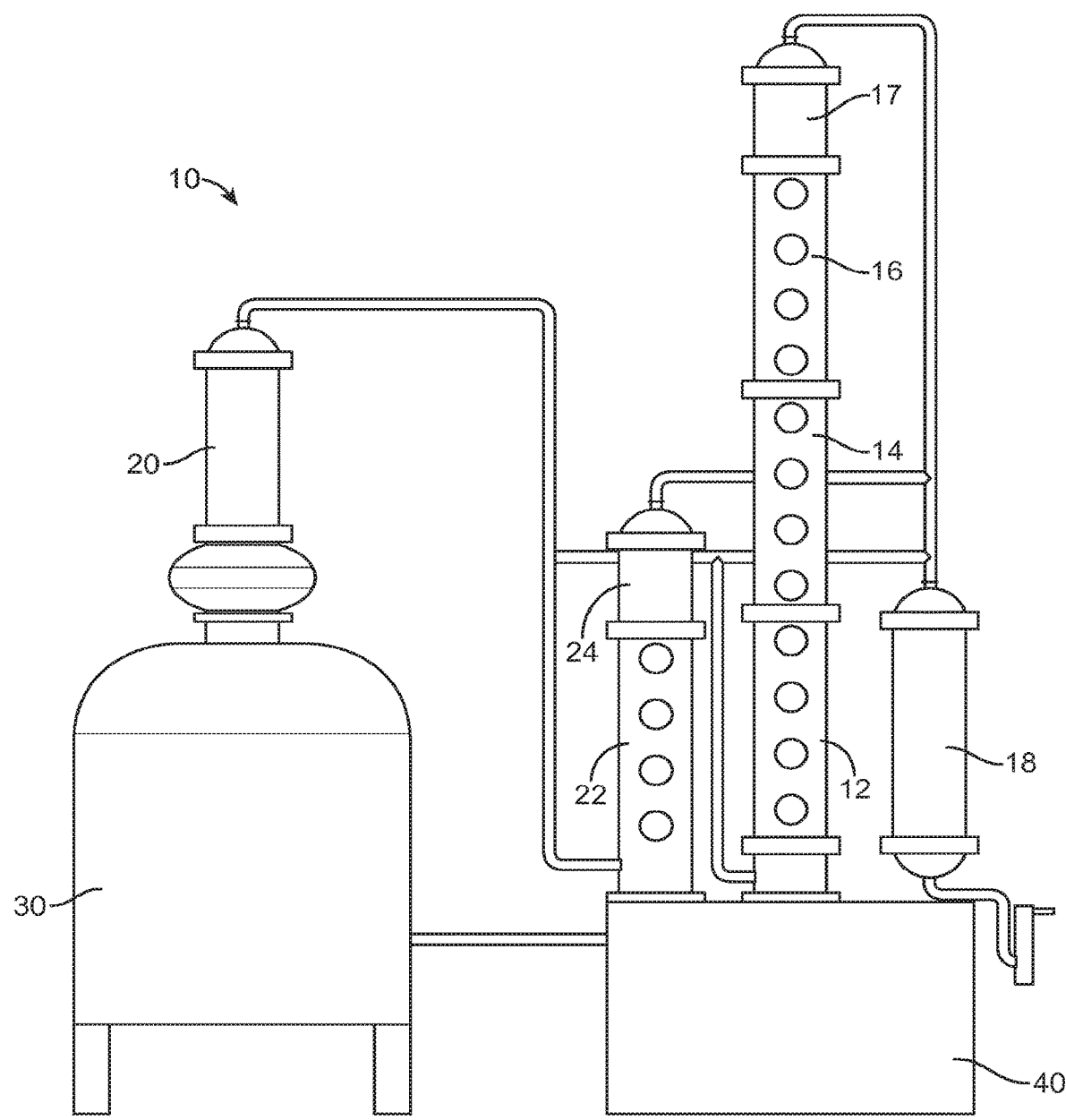
FIG. 1 shows a distillation system, in accordance with the present disclosure.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

As used in the description herein and throughout the claims, the following terms take the meanings explicitly associated herein, unless the context clearly dictates otherwise: the meaning of "a," "an," and "the" includes plural reference, the meaning of "in" includes "in" and "on." As used herein, the word "exemplary" means "serving as an example, instance, or illustration." Thus, any embodiment described herein as "exemplary" is not necessarily to be construed as preferred or advantageous over other embodiments. Furthermore, as used herein, numerical ordinals such as "first," "second," "third," etc., such as first, second, and third components, simply denote different singles of a plurality unless specifically defined by language in the appended claims.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

Referring now to the drawings, wherein the depictions are for the purpose of illustrating certain exemplary embodiments only and not for the purpose of limiting the same, FIG. 1 shows an exemplary distillation system 10 having various distillation and brewing components. The exemplary distillation system 10 shown includes a distillation vessel 30 connected to an expansion chamber having a pot still head 20. Dephlegmators 17 and 24 are connected to various distillation columns 12, 14, 16, and 22 above a mixing tank 40. A condenser 18 is connected to a parrot, i.e., recovery spout. Various integration piping is shown. The distillation system 10 is shown as exemplary to provide context for particular aspects and functions of the various distillation and brewing components. As the disclosure herein can be applied to various distillation systems and distillation equipment arrangements it is therefore not intended to be limited thereby.

Figure 2:
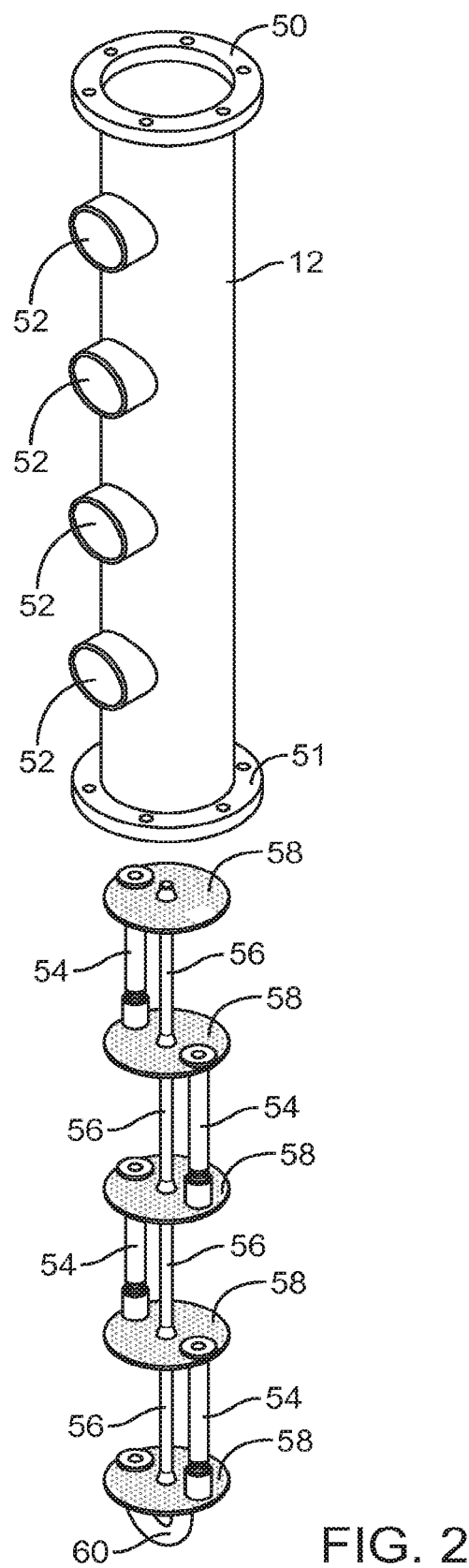
FIG. 2 is an exploded view of a distillation column and a removable tray assembly, in accordance with the present disclosure.

FIG. 2 shows the distillation column 12 and the removable tray assembly 53. The distillation column 12 may include one or more sight ports 52 for viewing interior portions of the column 12 and assembly 53, when inserted. The distillation tray assembly 53 includes a plurality of trays, i.e., plates 58, a plurality of downcomer tube assemblies 54, and a plurality of connecting rods 56. As FIG. 2 shows, the removable tray assembly 53 may be removed from the distillation column 12 enabling adjustment, exchange, or cleaning of various components of the assembly 53. For example, a distiller or brewer may adjust downcomer tubes 54 to change the fluid level on one or more of a plurality of plates 58, or bypass certain, desired plates all together.

In one embodiment, the distillation column 12 includes a top flange 50 and a bottom flange 51. The flanges 50 and 51 may be configured for connection to various distillation components e.g., a condenser or a dephlegmator, via various mechanical connections, e.g., bolts, clamps and/or weld joints. In various embodiments, thermoports may be included on a distillation column housing similar to the plurality of sight ports 52. The distillation column 12 is preferably formed to include a hollow cylindrical center portion for receiving the tray assembly 53. The tray assembly 53 may then be removed or inserted selectively.

Figure 3A:
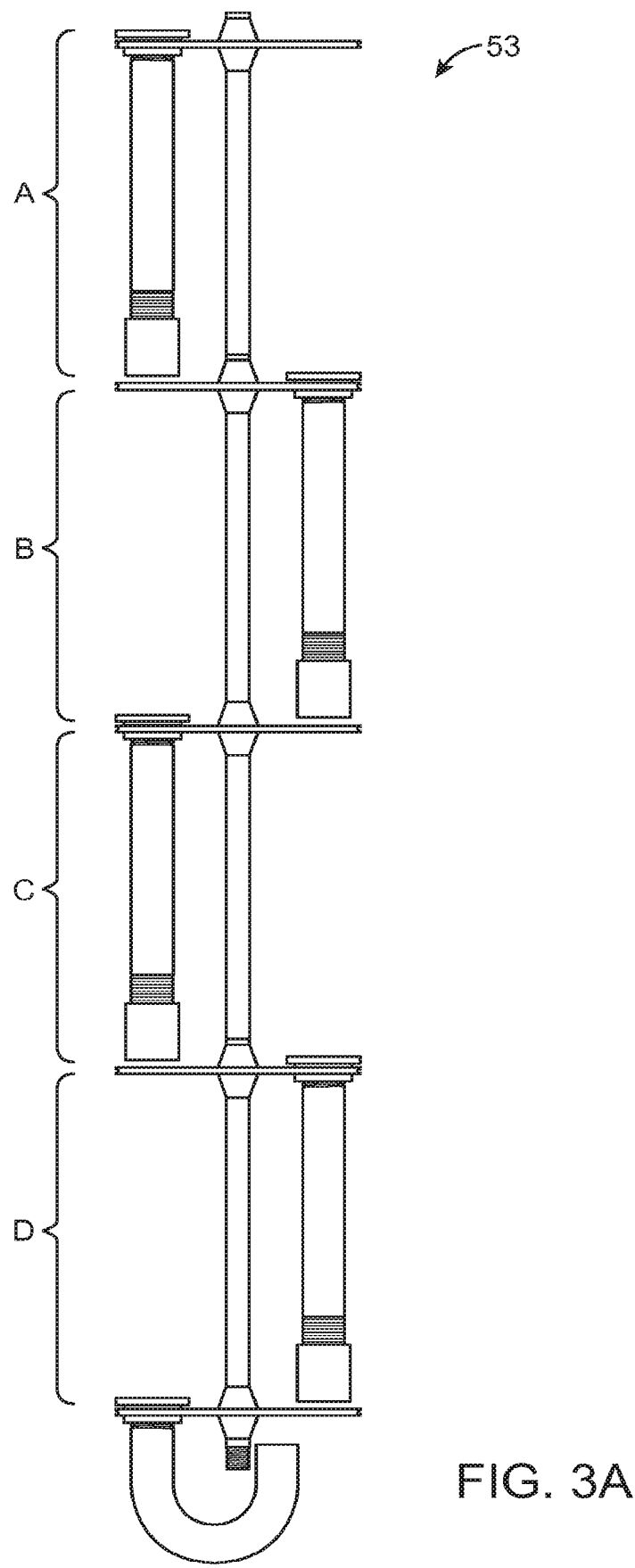
FIG. 3A is a side view of an embodiment of the removable tray assembly having four tray module sections, in accordance with the present disclosure.
Figure 3B:
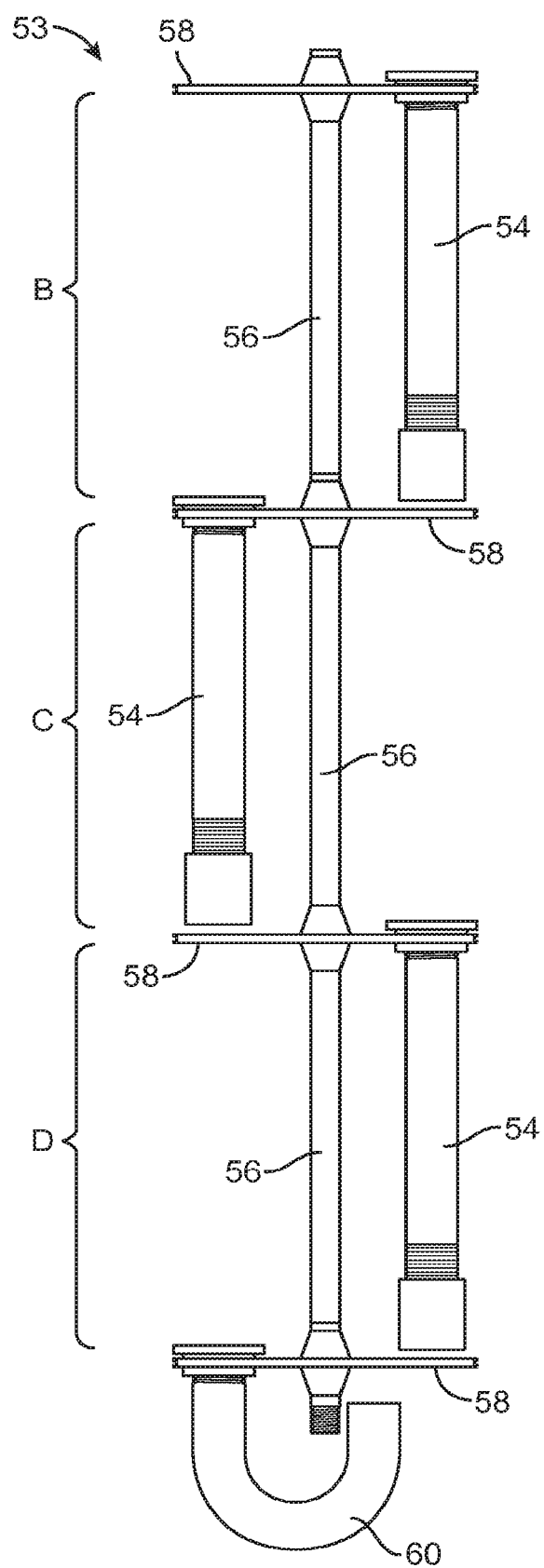
FIG. 3B is a side view of an embodiment of the removable tray assembly having three tray module sections, in accordance with the present disclosure.

FIGS. 3A and 3B are side views of the removable tray assembly 53 having components added or removed from the assembly 53 to vary an amount of levels. As FIG. 3A shows, one configuration of the assembly 53 can include four tray module sections: A, B, C, and D. As FIG. 3B shows, one configuration of the assembly 53 can include three tray module sections: B, C, and D. It is contemplated that one may add or subtract various tray module sections so that one or more tray module sections may be included for a particular, desired implementation. For example, one may remove an additional plate 58, connecting rod 56 and downcomer tube 54 from the assembly shown in FIG. 3B to implement an assembly having only two tray module sections.

Figure 4:
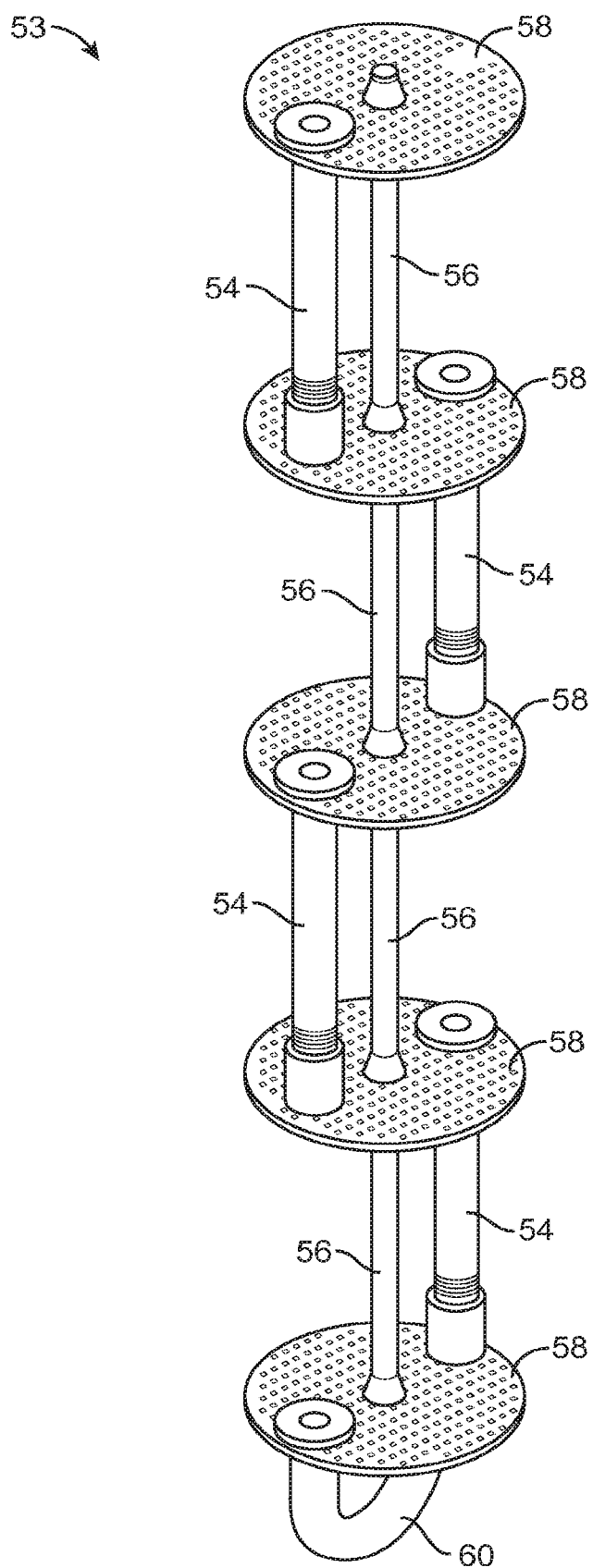
FIG. 4 is a perspective view of an embodiment of the removable tray assembly shown in FIG. 3A, in accordance with the present disclosure.

FIG. 4 shows the embodiment of the removable tray assembly 53 shown in FIG. 3A. As FIG. 4 shows, the tray assembly 53 includes a connecting rod 56 placed between each plate 58.

Figure 5A:
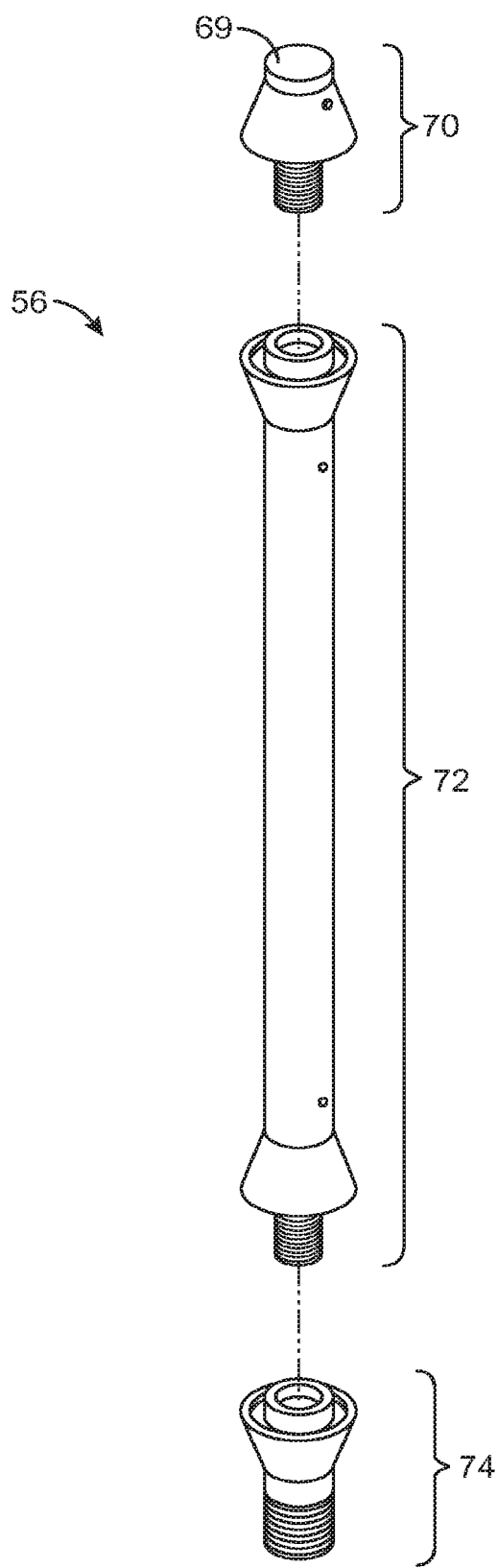
FIG. 5A is an exploded view of a connecting rod, in accordance with the present disclosure.
Figure 5B:
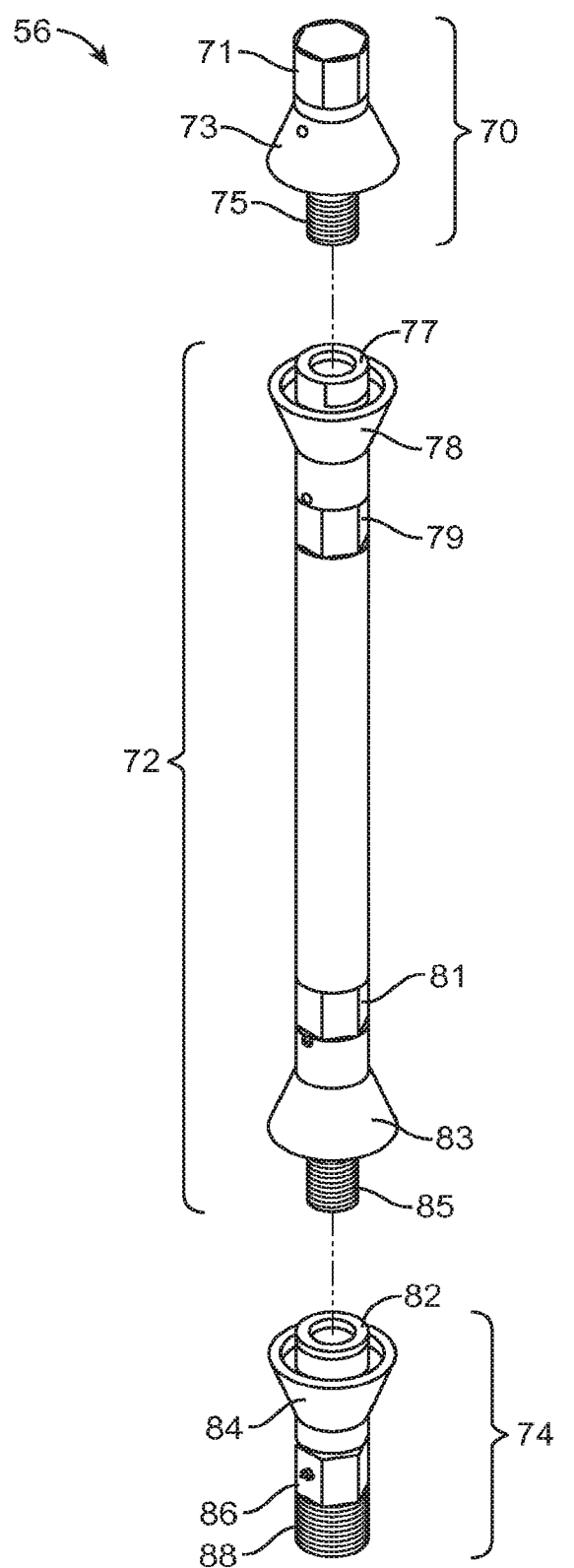
FIG. 5B is an exploded view of a further embodiment of a connecting rod, in accordance with the present disclosure.

FIGS. 5A and 5B shows exploded views of embodiments of a connecting rod 56. Connecting rods 56 are disassembled, generally, to remove plates to modify an amount of tray module sections of the assembly 53. The connecting rods 56 include a main rod 72, a top cap 70 and a bottom cap 74. In use, a first plate is pressed against a top end of the main rod 72 and the top cap 70 and a second plate is pressed against a bottom end of the main rod 72 and the bottom cap 74 as shown in FIGS. 3A, 3B, and 4. In one embodiment, the top cap 70 is a male threaded into the main rod 72, while the main rod 72 is threaded into the bottom cap 74. In various embodiments, the top end of the top cap 70 is removable so that successive bottom caps 74 may be threaded into the top caps 70 when arranged in a multi-moduled tray assembly 53 such as shown in FIGS. 3A, 3B, and 4. In one embodiment, the top of cap 70 is removable so that successive rods 72 may be threaded into one another.

Referring to FIG. 5B, the connecting rod 56 may include various fulcrum surface portions 71, 79, 81, and 86 for engagement to a lever-based mechanical tool, e.g., a wrench. In one embodiment, the fulcrum surface portions 71, 79, 81, and 86 are radially symmetrical. The connecting rod 56 preferably include conical-shaped portions 73, 78, 83, 84 for engagement to a surface of the plates 58. The conical-shaped portions enable wider, more stable engagement to surfaces of the plates 58. As shown in FIG. 5B, the top cap 70 includes a threaded portion 75 configured for engagement to a threaded portion 77. The main rod 72 includes a male threaded portion 85 configured for threaded engagement to a threaded portion 82 of the bottom cap 74. A male threaded portion 88 of the bottom cap 74 may be configured for threaded engagement to a top cap in one embodiment of a multi-moduled tray assembly 53 such as shown in FIGS. 3A, 3B, and 4. The first and final plates of the assembly 53 are secured via a top and bottom nut and bolt, in one embodiment, shown as element 69 in FIG. 5A and element 71 in FIG. 5B.

Figures 6A, 6B:
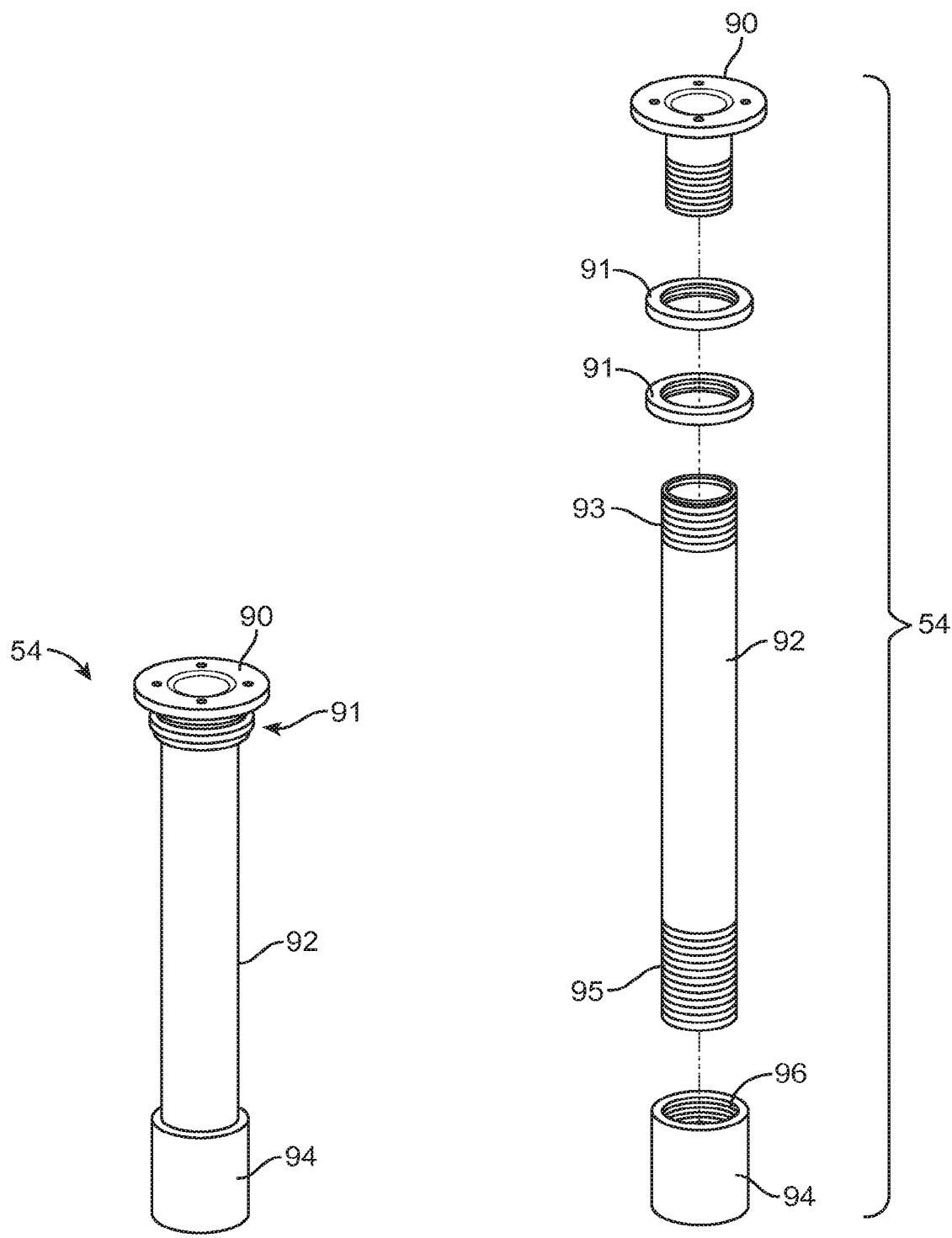
FIG. 6A shows an assembled downcomer tube, in accordance with the present disclosure.
FIG. 6B is an exploded view of an embodiment of the downcomer tube shown in FIG. 6A, in accordance with the present disclosure.
Figure 6C:
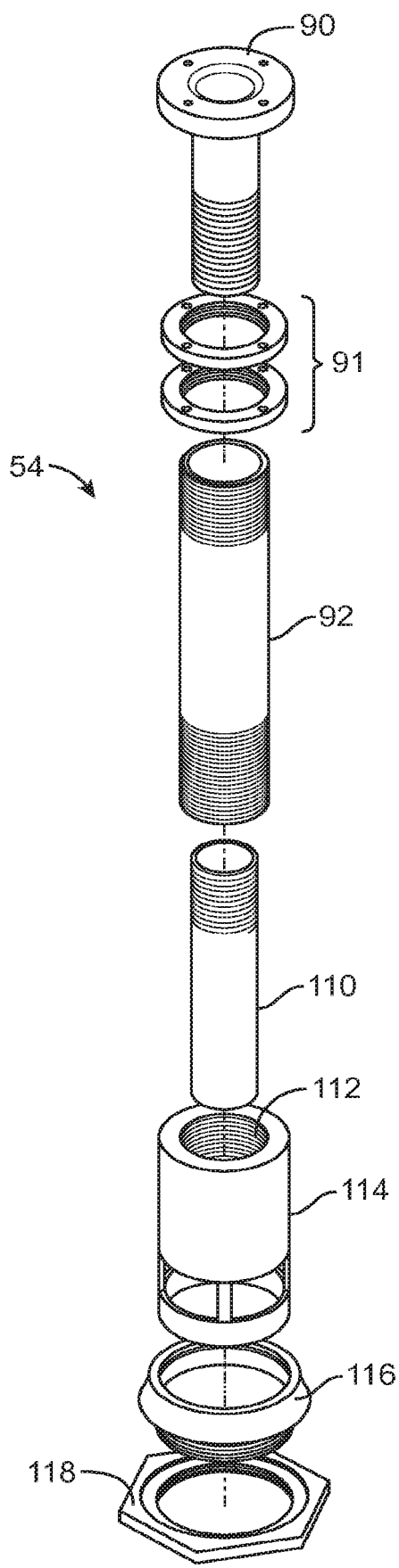
FIG. 6C is an exploded view of another embodiment of the downcomer tube, in accordance with the present disclosure.

FIG. 6A shows an assembled downcomer tube 54 and FIG. 6B shows an exploded view of that downcomer embodiment 54. FIG. 6C is an exploded view of another embodiment of the downcomer tube 54. The downcomer tubes 54 can be adjusted to set a desired head pressure (liquid level on the plate).

The downcomer tubes 54 have a height-adjustable cup 94 on the bottom that goes up and down, and the tubes have a top valve 90 at the top that adjusts up and down. When reducing an amount of modules in a multi-moduled tray assembly 53 embodiment such as shown in FIGS. 3A, 3B, and 4, the downcomer tubes 54 are removed if a plate 58 is removed and a corresponding connecting rods 56 are removed.

The valve 90 threads in or out of the top of a main tube 92 which affects a fluid level on a surface of the plate 58 higher or lower. The valve 90 is configured to receive fluid from a plate traveling down to the next plate. To increase fluid level on the plate 58, one would unscrew the valve 90 until it reached a desired height. Similarly, to reduce the fluid level on the plate 58 you would tighten the valve 90 in further to decrease a valve height. The valve 90 threads into the downcomer tube assembly 54 so the fluid level on the plate 58 can be adjusted as the valve 90 is threaded in further, or unthreaded to increase the height.

A height-adjustable cup 94 is threaded on the main tube 92 via threads 95 and 96. In various modes of operation, the height-adjustable cup 94 at the bottom of the downcomer tube 54 can be submerged in liquid on a preceding plate. It is contemplated that a distiller or brewer may adjust the cup 94 up or down to ensure full or desired submersion. In various embodiments, the cup 94 on the bottom of the downcomer tube 54 can thread up or down to adjust the space between bottom edge of the cup 94 and a top surface of the plate 58.

The downcomer tubes 54 include threaded rings 91 or nuts that may be used to abut a top surface and a bottom surface of the plates 58, respectively. For example, a first ring 91 may be positioned above a plate while a second ring is positioned below the plate. In this way, the rings 91 hold the plate 58 in place, while the valve 90 is free to independently laterally move above the plate 58 via threading from the main tube 92. The exemplary downcomer tubes 54 may mechanically mount in the off-center hole on the plate 58 with, for example, a nut on top and bottom and the connecting rods 56 join the assembly 53 together via the center hole 102.

Referring to FIG. 6C, in one embodiment directed to a bubble cap configuration, the cup 94 shown in FIGS. 6A and 6B is exchanged for an inner adjustable downcomer tube 110, an adjustable downcomer gate 114, a downcomer seal 116, and a seal retention nut 118. In one embodiment, FIGS. 6A and 6B may be used in a sieve tray application.

In a sieve tray configuration, vapor rises vertically through the distillate sitting on the plates 58 which is where purification occurs (more trays or "modules" typically results in greater purity). In a bubble cap tray configuration, vapor is pushed through the bubble cap plates 58 and then downward and out the combs on a bubble cap plate 58. This process pushes the vapor horizontally across the plate 58 to increase interaction with distillate sitting on the plate 58, enhancing purity.

In one exemplary operation, a bottom end of the downcomer tube 54 is submerged creating a seal but allowing distillate from above to flow downward through the downcomer tube 54. If there was no seal, the vapor would take the path of least resistance, chasing up the downcomer tube 54 and bypassing the holes in the tray or plate 58. In one exemplary sieve configuration, there is no seal, gate, or inner tube needed at a bottom of the downcomer tube 54, just an adjustable cup 94 to ensure submersion. In a bubble cap configuration, the vapor is traveling horizontally across the plate 58 which would blow the seal from beneath the cup 94 so we had to devise a way to ensure that seal. Hence, in a bubble cap configuration it is preferable to utilize the downcomer tube 54 embodied in FIG. 6C, rather than shown in FIGS. 6A and 6B.

Figure 7:
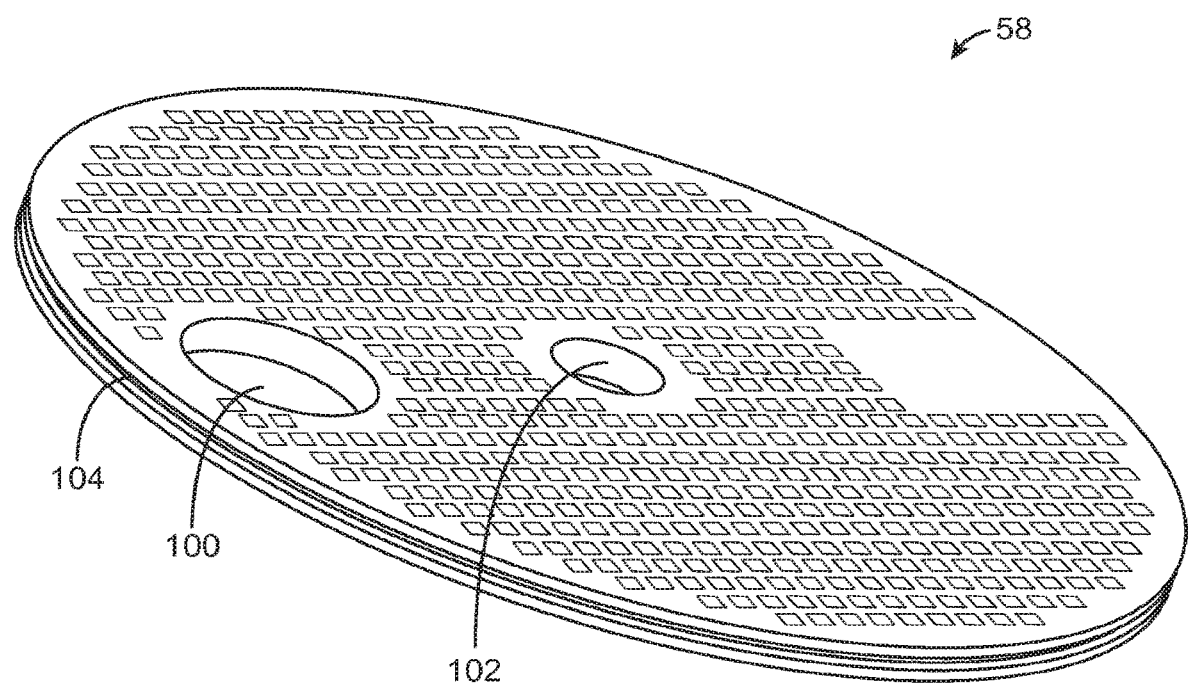
FIG. 7 shows an interchangeable distillation plate, in accordance with the present disclosure.
Figure 8:
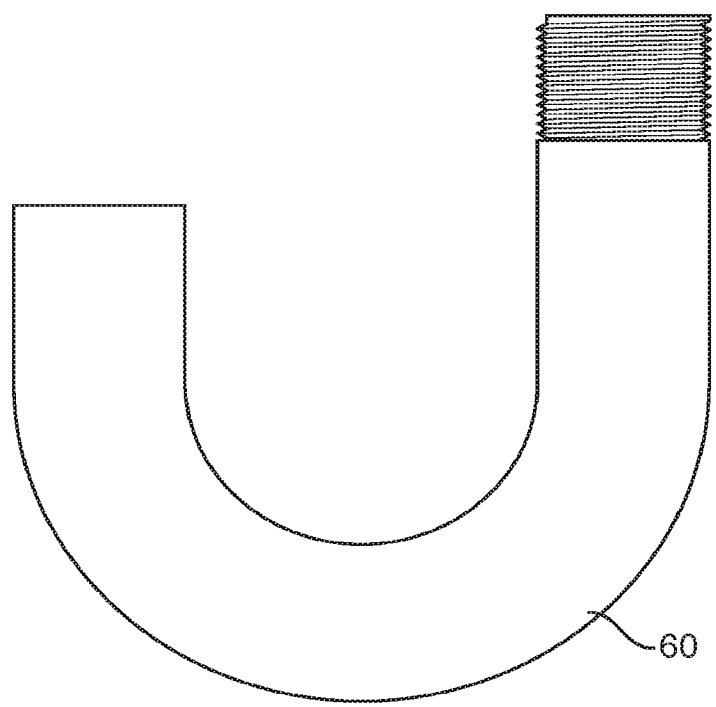
FIG. 8 shows a downcomer tube bent at substantially 180-degrees, in accordance with the present disclosure.
Figure 9A:
FIG. 9A is a cross-sectional side view of an interchangeable distillation plate taken along line A-A of FIG. 10, in accordance with the present disclosure.
Figure 9B:
FIG. 9B is a side view of an interchangeable distillation plate, in accordance with the present disclosure.
Figure 10:
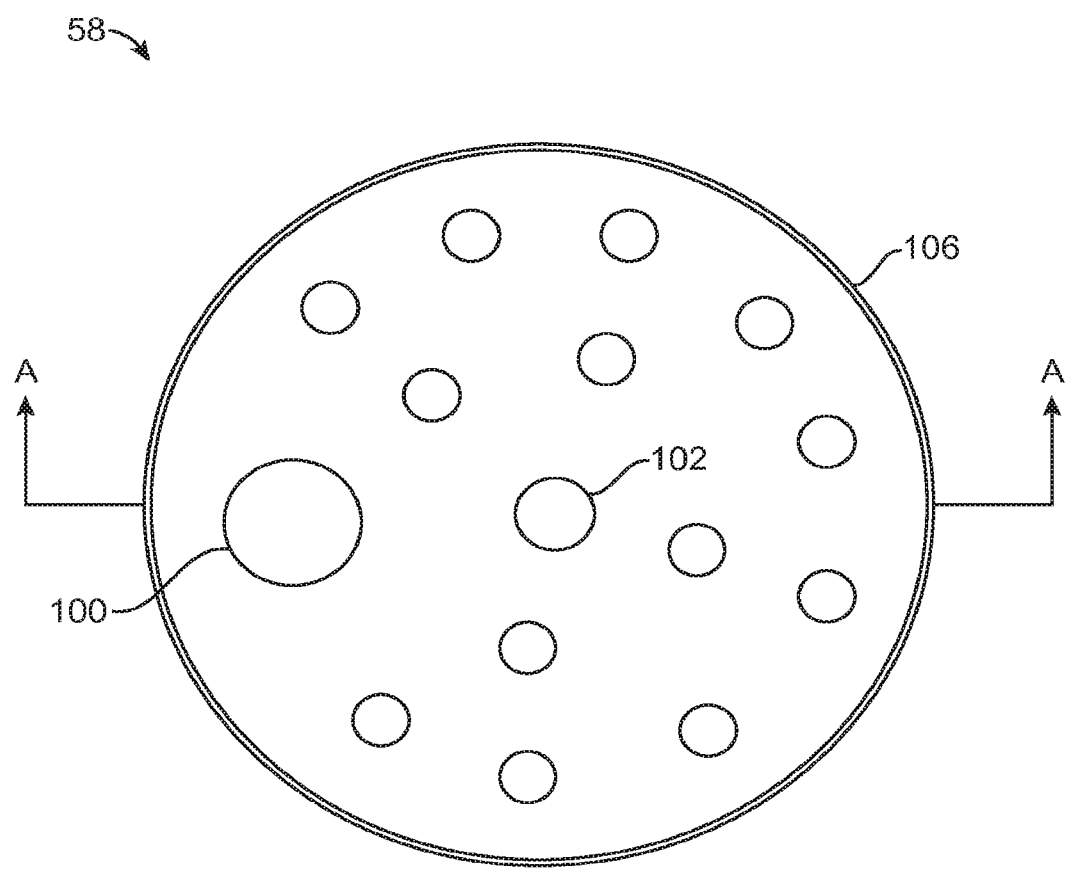
FIG. 10 is a cross-sectional side view of the interchangeable plate, in accordance with the present disclosure.

When distilling using the downcomer tube shown in FIG. 6C in a bubble cap configuration, the downcomer seal 116 is affixed to the plate 58 by engaging the seal retention nut 118. The downcomer seal 116 has a flush flange that is level with a top plate surface when inserted through a plate opening such as opening 100 shown in FIG. 7. The adjustable downcomer gate 114 can then be raised or lowered depending on the height of the combs on the bubble cap plates 58 that are used. For example, in one embodiment, upper tray plates 58 of the assembly 53 have higher combs and lower tray plates have shorter combs.

The inner adjustable downcomer tube 110 is configured to selectively thread up and down inside the downcomer 54, and inside the main tube 92. It is adjustable as desired to ensure submersion and will also affect liquid left sitting in the downcomer 54 during use which also helps seal in the event of a seal blowout.

Referring now to FIGS. 7, 9A, 9B, and 10, illustrating embodiments of an interchangeable plate 58. There are different style plates with different characteristics, for example, a sieve tray plate or a bubble cap type-tray plate as referred to above. As described above, the downcomer tubes 54 connect to the plates 58 via a hole or opening 100 positioned toward an outer perimeter of the plates 58. O-rings 104 are placed around the perimeter of the plates 58. In one embodiment, the O-rings 104 are positioned within a recess 107 of the plates 58 as shown in exemplary FIG. 9B. The recess 107 is preferably in a middle portion of a circumference of the plate edge. The recessed O-ring permits a tight seal to an interior surface, i.e., interior side wall, of the distillation column 12, inhibiting or prohibiting gaseous or liquid communication of fluids around the plates 58. In various embodiments, the plates 58 include a plurality of apertures and are foraminous.

Figure 11:
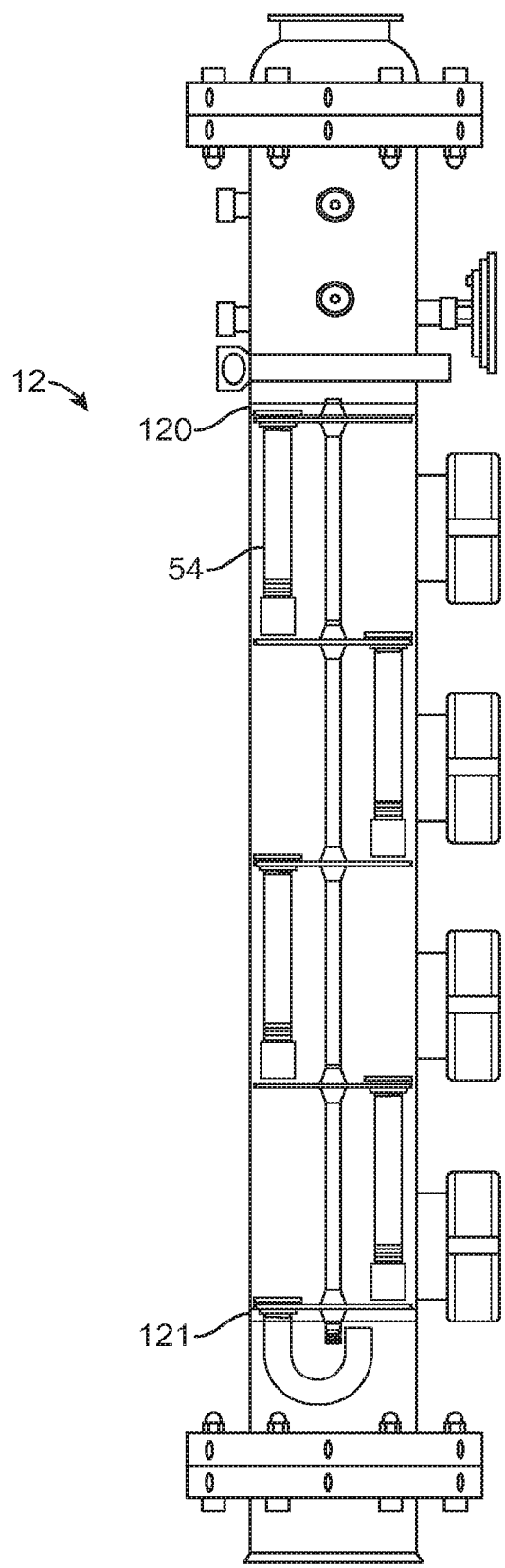
FIG. 11 is a cross sectional view of a distillation column having a removable tray assembly inserted, in accordance with the present disclosure.

FIG. 11 shows a partial cross-sectional view of the distillation column 12 and assembly 53, illustrating positioning of the assembly 53 within the column 12. In use, the entire tray assembly 53 is positioned within the column 12 preferably using releasable retention clamps 120 and 121 placed toward a top end and a bottom end of the column 12. The clamps 120 and 121 prevent the assembly 53 from moving laterally within the column 12.

In use, the entire tray assembly 53 could be removed from the column 12 (by sliding the tray assembly out the bottom side of the column) and at that point the tray assembly can be adjusted (by way of the downcomer tubes) or plates changed/removed. The downcomer tubes 54 set the liquid level present on each plate when running The disclosure has described certain preferred embodiments and modifications thereto. Further modifications and alterations may occur to others upon reading and understanding the specification. Therefore, it is intended that the disclosure not be limited to the particular embodiment(s) disclosed for carrying out this disclosure, but that the disclosure will include all embodiments falling within the scope of the appended claims.

The invention claimed is:

1. A distillation column comprising:
   a plurality of distillation trays, each having a recessed O-ring along a circumferential edge;
   one or more connecting rods configured to engage and secure the plurality of distillation trays;
   a plurality of downcomer assemblies, each engaged to at least one of the plurality of distillation trays and configured to extend and retract with respect to the at least one of the plurality of distillation trays;

wherein at least one of the plurality of downcomer assemblies comprises:
a hollow tube;
an adjustable valve adjustably connected to the hollow tube;
a cup configured to mechanically and fluidly connect to the hollow tube;
a first ring engaged with the hollow tube and one distillation tray of the plurality of the distillation trays; and,
a second ring engaged with the hollow tube and one distillation tray of the plurality of the distillation trays.

2. The distillation column of claim 1, wherein the connecting rods are removably attached to a first distillation tray and a second distillation tray of the plurality of distillation trays, and wherein the connecting rods comprise a plurality of fulcrum surface portions.

3. The distillation column of claim 1, wherein the O-ring is configured to sealingly engage an interior wall of the distillation column.

4. The distillation column of claim 1, wherein the plurality of distillation trays, the one or more connecting rods and the plurality of downcomer assemblies comprise a removable tray assembly.

5. The distillation column of claim 1, wherein the plurality of distillation trays are sieve-type distillation trays.

6. The distillation column of claim 1, wherein the plurality of distillation trays are bubble cap-type distillation trays.

7. The distillation column of claim 1, wherein one or the plurality of downcomer tubes is bent at substantially 180-degrees.

* * * * *